March 28, 1967 T. S. KULKA 3,311,228

TAPE REEL PROTECTIVE CLOSURE AND LATCH

Filed Oct. 11, 1965 4 Sheets-Sheet 1

INVENTOR
THOMAS S. KULKA

BY Almon S. Nelson.
ATTORNEY

March 28, 1967 T. S. KULKA 3,311,228

TAPE REEL PROTECTIVE CLOSURE AND LATCH

Filed Oct. 11, 1965 4 Sheets-Sheet 2

INVENTOR
THOMAS S. KULKA

BY Almon S. Nelson
ATTORNEY

March 28, 1967 T. S. KULKA 3,311,228

TAPE REEL PROTECTIVE CLOSURE AND LATCH

Filed Oct. 11, 1965 4 Sheets-Sheet 3

INVENTOR
THOMAS S. KULKA

BY Elmer S. Nelson
ATTORNEY

March 28, 1967 T. S. KULKA 3,311,228

TAPE REEL PROTECTIVE CLOSURE AND LATCH

Filed Oct. 11, 1965 4 Sheets-Sheet 4

INVENTOR
THOMAS S. KULKA

BY Elmon S. Nelson
ATTORNEY

United States Patent Office 3,311,228

Patented Mar. 28, 1967

3,311,228

TAPE REEL PROTECTIVE CLOSURE AND LATCH

Thomas S. Kulka, 200 Film Bldg., 2188 Payne Ave., Cleveland, Ohio 44114

Filed Oct. 11, 1965, Ser. No. 494,791
7 Claims. (Cl. 206—52)

This invention relates to the handling and storage of material and more particularly to a tape reel protective closure and latch for application to a reel having tape wound thereon and in which the device of this invention provides a closure for the space between the flanges of the reel to protect tape wound thereon. This invention is an improvement over the inventions disclosed and claimed in my prior Patent 2,822,919, dated Feb. 11, 1958, and Patent 3,124,243, dated Mar. 10, 1964.

The use of tape wound on reels has become extremely prevalent during the past few years largely by reason of the vastly increased use of magnetic tape for the recording of sound and also by the use of video tape and furthermore, magnetic tape has also found wide usage in electronic computers. These various uses of tape wound on reels are, of course, in addition to the use of film wound on reels, particularly in the motion picture field.

In utilizing tape wound on reels considerable difficulty has been experienced in providing proper storage facilities to prevent damage to the tape and also to prevent contamination of the same by dust or other foreign materials. Various means have been proposed for overcoming these difficulties, but many of these are relatively complex and costly and do not in all cases satisfactorily solve the problems.

Of late it has become customary to supply a tape reel having imperforate flanges which therefore protect the side edges of the tape wound thereon and this invention proposes to utilize this feature in conjunction with a device for closing the outer circumference of the space between the flanges of the reel to provide a completely enclosed space in which the tape is disposed thereby protecting the same. It is therefore apparent that the provision of reels having imperforate flanges makes it possible to provide a relatively simple and inexpensive device for affording complete protection of the tape.

It is accordingly an object of the invention to provide a tape reel protective closure and latch which may be applied to the flanges of the reel to close the space between the flanges and protect tape wound thereon.

A further object of the invention is the provision of a tape reel protective closure and latch which may be conveniently and economically constructed from readily available material and which may be applied to a conventional tape reel and removed therefrom by a simple manual manipulation and without requiring the use of tools.

A still further object of the invention is the provision of a tape reel protective closure and latch which may be applied to the peripheral edges of the flanges of the reel to provide a tight and substantially dust-proof closure thereby affording protection for the tape wound on the reel.

Another object of the invention is the provision of a tape reel protective closure and latch including grooves for receiving the peripheral edges of the flanges of the reel in order to provide a substantially dust-tight closure for the space between the flanges of the reel.

A further object of the invention is the provision of a tape reel protective closure and latch and including a strap of flexible yieldable material of a length to extend around the periphery of the flanges of the reel with releasable latch means for retaining the strap in position on the reel to protect tape wound thereon.

A still further object of the invention is the provision of a tape reel protective closure and latch including a strap of flexible yieldable material having side flanges to engage over the flanges of the reel and with the inner edges of the side flanges beveled to facilitate application of the same to the flanges of the reel.

Another object of the invention is the provision of a tape reel protective closure and latch including a strap of flexible yieldable material and an arcuate member cooperating with the strap to retain the same in a generally circular condition.

A further object of the invention is the provision of a tape reel protective closure and latch including a strap of flexible yieldable material and an endless contractible member cooperating with the strap to urge the same into closed position around a reel.

A still further object of the invention is the provision of a tape reel protective closure and latch including a strap of flexible yieldable material and an endless expandable member cooperating with the strap to urge the ends of the same apart and facilitate removal or application of the same to a reel.

Another object of the invention is the provision of a tape reel protective closure and latch and including a hook attached to the closure for conveniently suspending the closure and a reel enclosed thereby from a suitable support.

Further objects and advantages of the invention will be apparent from the following description taken in conjunction with the accompanying drawings wherein.

Figure 1:
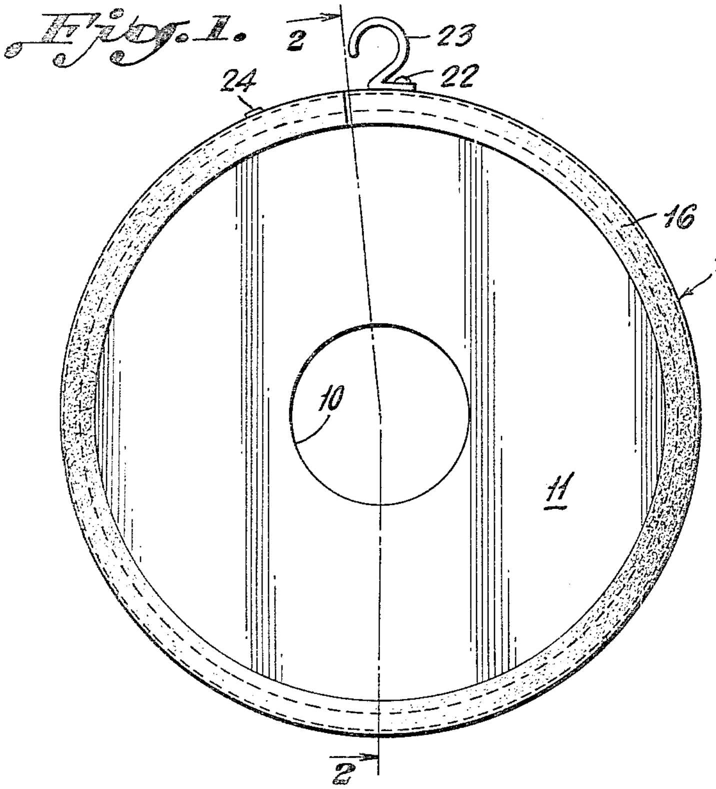
FIG. 1 is a side elevational view of a tape reel with the protective closure and latch of this invention applied thereto.
Figure 2:
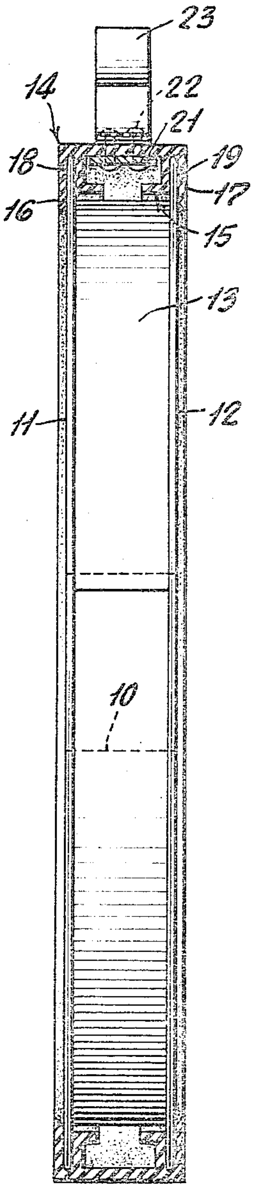
FIG. 2 is a sectional view taken substantially on the line 2—2 of FIG. 1 and showing the manner in which the protective closure engages the flanges of the reel.
Figure 3:
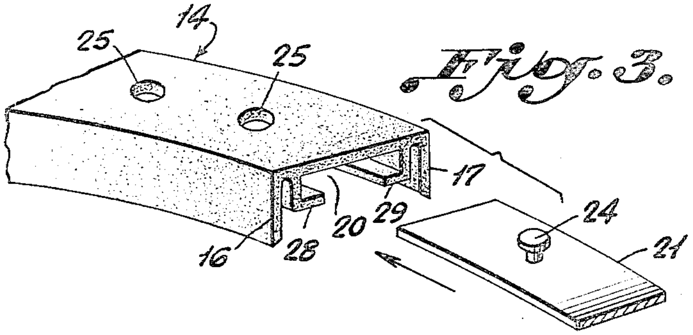
FIG. 3 is a fragmentary view in perspective showing the latch means for the protective closure of FIG. 1 in open position.
Figure 4:
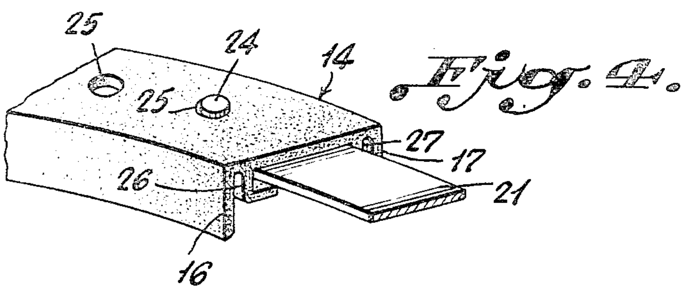
FIG. 4 is a fragmentary perspective view similar to FIG. 3 but showing the latch means in closed position to retain the protective closure on the reel.
Figure 5:
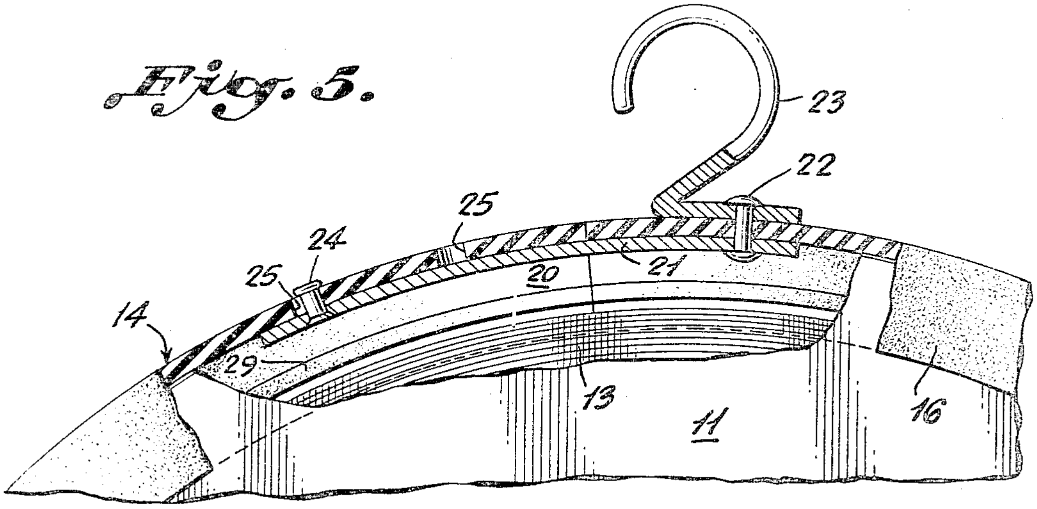
FIG. 5 is a fragmentary side elevational view with parts broken away and in section for greater clarity and showing the structure of the latch means in closed position and also the manner of attaching the supporting hook to the protective closure.
Figures 6, 7, 8, 9, 10:
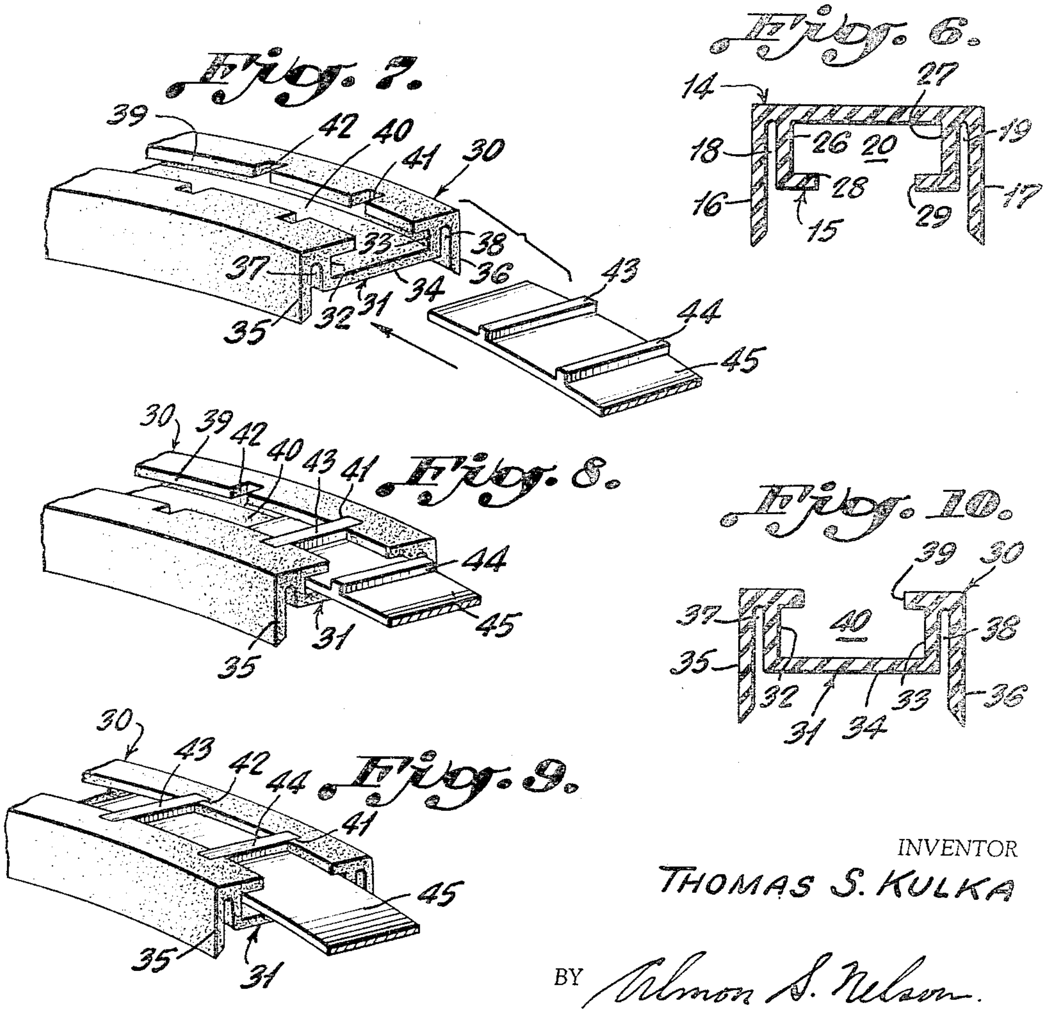
FIG. 6 is a transverse sectional view showing one form of the strap providing the protective closure.
FIG. 7 is a fragmentary view in perspective showing another form of latch means in open position.
FIG. 8 is a fragmentary view in perspective similar to FIG. 7 showing the latch means of FIG. 7 in one closed position.
FIG. 9 is a fragmentary view in perspective similar to FIG. 8 but showing the latch means in another closed position.
FIG. 10 is a transverse sectional view showing another form of strap providing the closure of this invention.

With continued reference to the drawings and particularly FIG. 1–6, there is shown a conventional tape reel having a hub 10 and spaced flanges 11 and 12 for retaining tape 13 wound on the hub. The protective closure and latch of this invention comprises a strap 14 of flexible yieldable material and of a length to extend around the periphery of the flanges 11 and 12 of the reel. As best shown in FIGS. 2 and 6, the strap 14 is provided with a body portion 15 of a width to be tightly received between the flanges 11 and 12 and inwardly projecting radial flanges 16 and 17 are provided on opposite side edges of the strap 14 with the radial flanges 16 and 17 spaced outwardly from the body portion 15 to provide grooves 18 and 19 for receiving the flanges 11 and 12 of the reel as clearly shown in FIG. 2.

The body portion 15 of the strap 14 is provided with a longitudinal opening 20 in at least one end of the strap 14 and a projecting tab 21 is secured to the opposite end of the strap 14 by any suitable fastening means such as a rivet 22, and the rivet 22 also serves to secure a hook 23 to the strap 14, and the purpose of such hook 23 will be later described. The tab 21 is of relatively stiff material and is of a length to project into the opening 20 as clearly shown in FIG. 5 when the protective closure is in place on the reel and the tab 21 is provided with a stud 24 thereon which may be releasably received in one of the spaced apertures 25 provided in the strap 14. Thus, as shown in FIGS. 4 and 5, engagement of the stud 24 with one of the apertures 25 serves to releasably retain the strap 14 on the reel and since the flanges 11 and 12 of the reel are received in the grooves 18 and 19 of the strap, this serves to provide an adequate closure for protecting the tape 13 wound on the hub 10 of the reel, and the protective closure as well as the reel and tape enclosed thereby may be conveniently suspended from a suitable support by means of the hook 23 thereby providing for convenient storage of the entire assembly.

It is to be noted that the body portion 15 of the strap 14 as clearly shown in FIG. 6 comprises spaced inwardly projecting radial walls 26 and 27 and an inner peripheral wall provided by peripheral flanges 28 and 29 projecting toward each other from the inner edges of the radial walls 26 and 27 and terminating in spaced relationship which serves to provide the longitudinal opening 20 in the body portion 15 of the strap 14.

With particular reference to FIGS. 7–10, there is shown a modified form of strap as well as a modified form of latch means and as shown, the strap 30 is provided with a body portion 31 formed by spaced inwardly projecting radial walls 32 and 33 and an inner peripheral wall 34 connecting the inner edges of the radial wall 32 and 33, and the strap 30 is also provided with inwardly projecting radial flanges 35 and 36 spaced outwardly from the radial walls 32 and 33 to provide real flange receiving grooves 37 and 38.

The strap 30 is provided with a central longitudinal slot 39 opening into the space 40 provided by the radial walls 32 and 33 and the inner peripheral wall 34 and the opposite side edges of the slot 39 may be provided with spaced aligned slots 41 and 42 which serve to selectively and releasably receive spaced ribs 43 and 44 provided on a tab 45 secured to the opposite end of the strap 30 to secure the strap in closing position around the flanges of the reel. The engagement of the rib 43 with the slot 41 is shown in FIG. 8, while the engagement of the ribs 43 and 44 for the slot 41 and 42 is shown in FIG. 9.

In FIGS. 11–14 there is shown a still further modified form of strap providing the closure and also a modified latch means and with particular reference to these figures a strap 46 of flexible yieldable material is provided with a body portion 47 formed by inwardly projecting radial walls 48 and 49 connected by an inner peripheral wall 50 to provide a longitudinal opening 51 in the body portion 47. Inwardly projecting radial flanges 52 and 53 are provided on the side edges of the strap 46 and the flanges 52 and 53 are spaced outwardly from the radial walls 48 and 49 to provide reel flange receiving grooves 54 and 55.

Figures 11, 14:
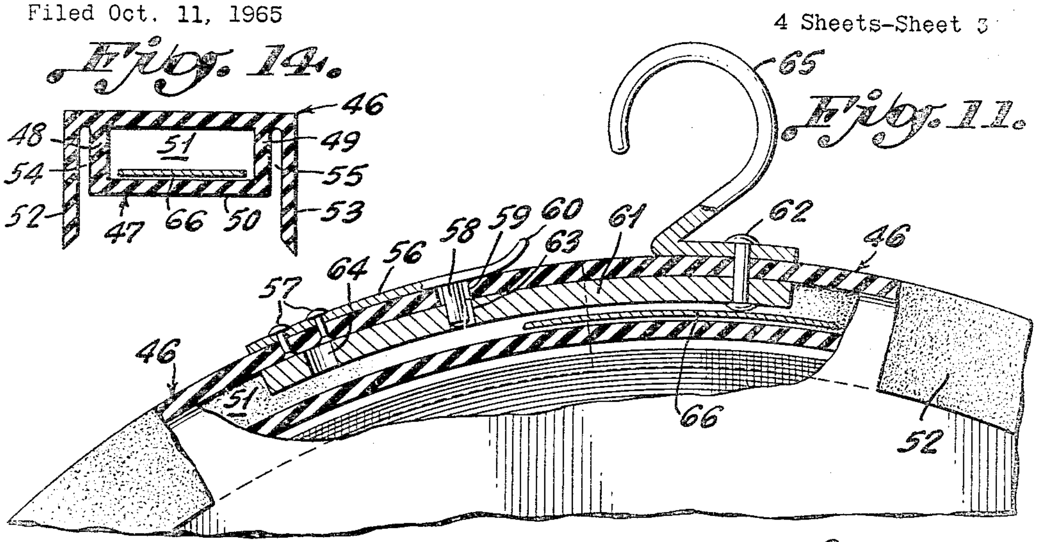
FIG. 11 is a fragmentary elevational view with parts broken away and in section for greater clarity and showing a still further modified form of latch means for the protective closure.
FIG. 14 is a transverse sectional view showing a still further modified form of strap providing the protective closure.
Figures 12, 15:
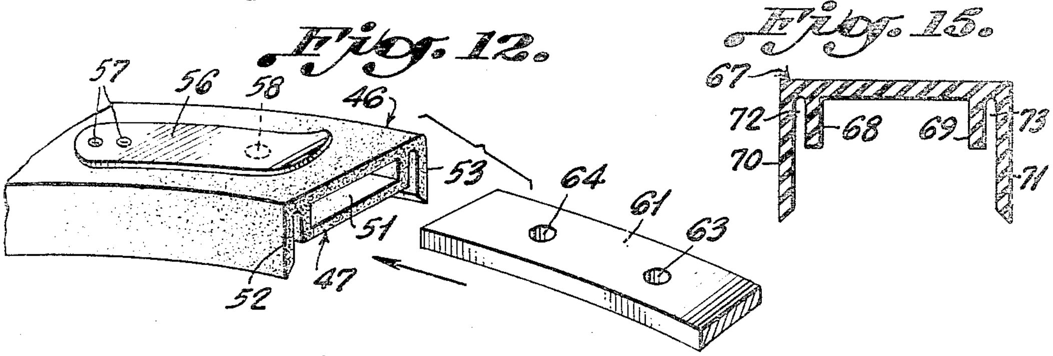
FIG. 12 is a fragmentary view in perspective showing the latch means of FIG. 11 in open position.
FIG. 15 is a transverse sectional view showing a still further modified form of strap providing the protective closure.
Figure 13:
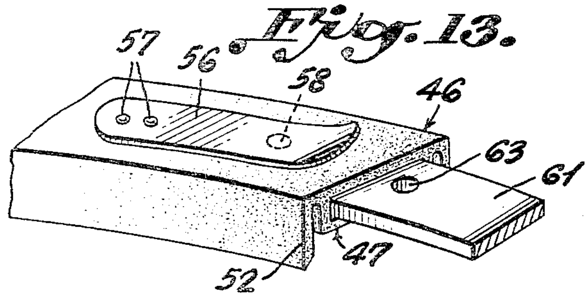
FIG. 13 is a fragmentary view in perspective similar to FIG. 12, but showing the latch means in closed position to retain the protective closure on the reel.

The modified latch means shown in FIGS. 11, 12 and 13 comprises a resilient strip 56 secured at one end by suitable fastening means 57 to the strap 46 and a stud 58 is provided adjacent the opposite end of the resilient strip 56 with the stud 58 projecting through an aperture 59 in the strap 46 into the longitudinal space 51 in the strap 46. A finger engaging portion 60 may be provided on the strip 56 to facilitate operation thereof. A tab 61 is secured by suitable fastening means such as a rivet 62 to the end of the strap 46 opposite from the resilient strip 56 and when the strap 56 is in closing position around a reel the tab 61 may project into the longitudinal opening 51 in the strap 46 and the stud 58 may be selectively received in one of the apertures 63 or 64 in the tab 61 to retain the strap 46 in place on the reel. A hook 65 may be secured to the strap 46 by the fastening means 62 and the hook 65 provides a convenient means for suspending the strap 46 and reel enclosed thereby from any suitable supporting means to facilitate storage thereof.

The latch means of FIG. 11 is shown in open position in FIG. 12 and in closed position in FIG. 13.

In order to retain the strap 46 in a generally circular condition with the latch disengaged there may be provided an arcuate member 66 disposed in the longitudinal space 51 in the body 50 of the strap 46 with the member 66 extending into both ends of the strap 56 when the latch is disengaged, thereby maintaining the strap in a generally circular condition. Furthermore, if desired, the arcuate member 66 may take the form of an endless contractable member which will operate to urge the strap 46 into closed position around a reel, or if desired the arcuate member 66 may take the form of an endless expandable member which will serve to urge the ends of the strap 46 apart and facilitate removal of the same from a reel.

In FIG. 15 there is shown a still further modified form of protective closure in which a strap 67 of flexible yieldable material is provided with inwardly projecting spaced radial walls 68 and 69 to form a body portion to be received between the flanges of a reel and the strap 67 is also provided with inwardly projecting radial flanges 70 and 71 spaced outwardly from the radial walls 68 and 69 to provide grooves 72 and 73 for receiving the peripheral edges of the flanges of the reel. The form of strap shown in FIG. 15 may be provided with any of the latch means previously described.

Figure 17:
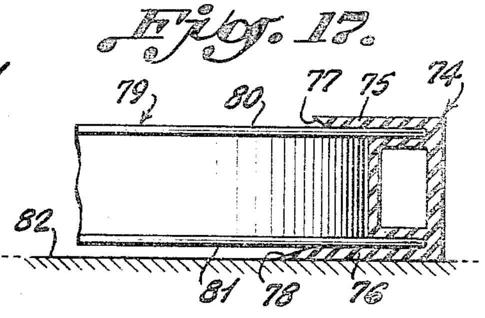
FIG. 17 is a view similar to FIG. 16 but showing the protective closure strap in place on the reel.
Figure 16:
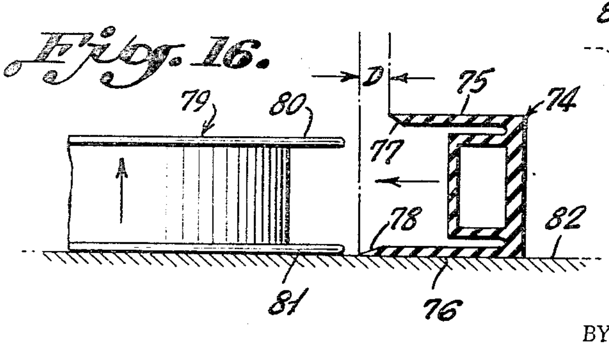
FIG. 16 is a transverse sectional view with parts in elevation and showing a modified form of strap having means for facilitating application of the same to the flanges of a reel.

In order to facilitate application of the strap providing the protective closure of this invention to the flanges of a reel, the inner edges of the inwardly projecting radial flanges of the strap in all previous forms of the invention may be beveled and in order to further facilitate the application of the strap to the reel the same may be modified as shown in FIGS. 16 and 17 in which a strap 74 is provided with inwardly projecting radial flanges 75 and 76 with the inner peripheral edges thereof beveled as shown at 77 and 78. As clearly shown in FIG. 16, the flange 76 extends inwardly beyond the flange 75, a distance D. In applying this modified form of the invention to a reel as shown in FIG. 16 a reel 79 having flanges 80 and 81 may be positioned on a supporting surface 82 and the strap 74 forming the protective closure is also placed on the supporting surface 82 outwardly of the reel 79 and with longer inwardly projecting flange 76 disposed on the supporting surface 82. Upon movement of the flange 76 toward the flange 81 of the reel 79 the beveled edge 78 of the flange 76 will slide under the flange 81 of the reel 79 thereby raising the reel 79 above the supporting surface 82 and permitting convenient full engagement of the protective closure strap 74 with the reel 79. The final position of the closure strap 74 is clearly shown in FIG. 17.

Figure 18:
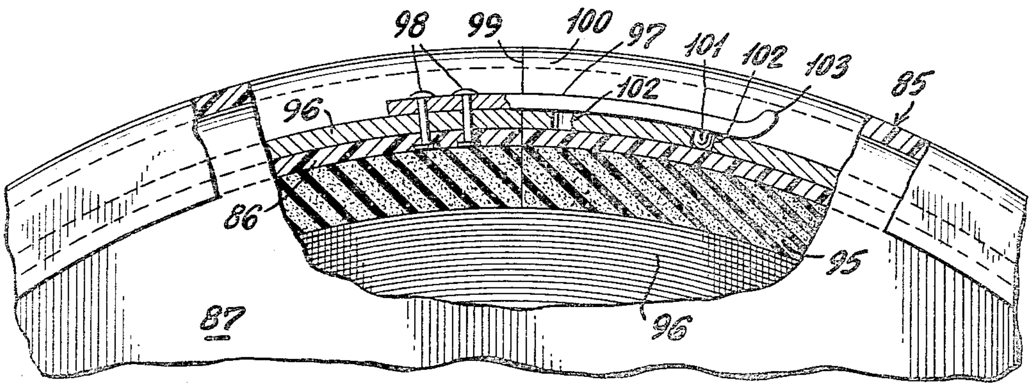
FIG. 18 is a fragmentary elevational view with parts broken away and in section showing a still further modified form of the invention incorporating a strip of cushioning material for engaging the tape as well as means for closing the strap.
Figure 19:
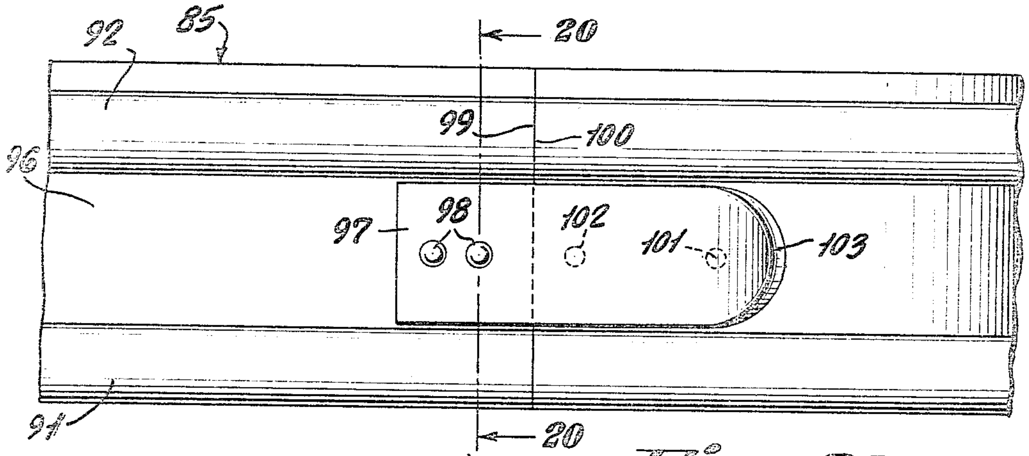
FIG. 19 is a planned view of the structure shown in FIG. 18.
Figure 20:
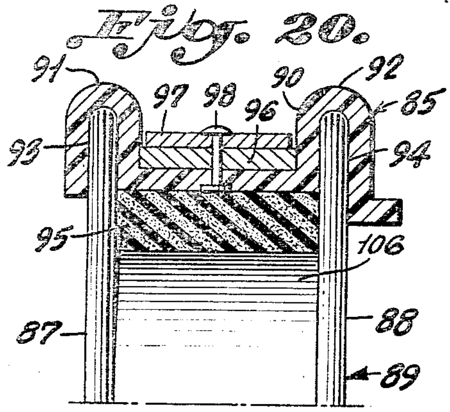
FIG. 20 is a sectional view substantially on the line 20—20 of FIG. 19.

With particular reference to FIGS. 18–20, there is shown a still further modified form of the invention in which there is provided a strap 85 of flexible material such strap having a body portion 86 to be received between the flanges 87 and 88 of a tape reel 89 and the body 86 is provided with an outwardly opening groove 90 extending throughout the length thereof and on each side of the groove are flanges 91 and 92 having inwardly opening grooves 93 and 94 therein for receiving the flanges 87 and 88 of the reel 89. Secured to the inner side of the body 86 by a suitable adhesive or any other desired means is a strip 95 of cushioning material such as foam rubber or the like and as clearly shown in FIG. 20 the strip 95 serves to contact the peripheral surface of the tape 106 wound on the reel 89 in such a manner as to prevent unwinding of the tape and to provide protection therefor. Furthermore the strip 95 will engage the inner surfaces of reel flanges 87 and 88 to provide a further seal against the entry of dust or foreign material.

A resilient band 96 is disposed in the groove 90 and extends throughout the length of the strap 85 and such band 96 is tensioned in such a manner as to bias the strap 85 inwardly into engagement with the reel 89. A tab 97 is secured to one end of the strap 85 and one end of the band 96 by rivets 98 or other suitable fastening means and the tab 97 projects outwardly from the adjacent end 99 of the strap 85 to be received in the groove 90 and overlie the band 96 at the opposite end 100 of the strap 85. The tab 97 is provided with an inwardly projecting stud 101 and this stud may be selectively received in aperture 102 in the band 96 to lock the strap 85 in position around the reel 89. The rivets 98 provide a common fastening means for the tab 97 and band 96 and no further fastening means for securing the band 96 in place is necessary which feature operates to reduce the cost of constructing the device of this invention. The tab 97 may be provided with a finger engaging portion 103 at the end thereof to facilitate flexing of the same to withdraw the stud 101 from the aperture 102 when it is desired to remove the device from the reel 89.

Figure 21:
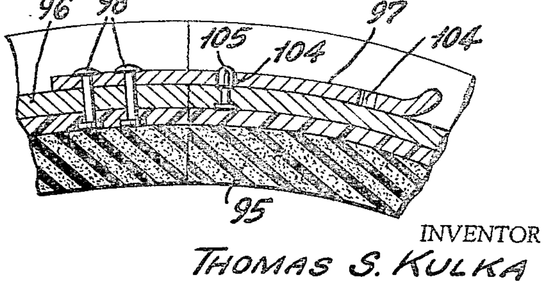
FIG. 21 is a fragmentary sectional view showing the structure of FIG. 18 with a further modified form of latch means.

With particular reference to FIG. 21 there is shown a slightly further modified form of latch in which the tab 97 is provided with spaced apertures 104 and a stud 105 projects outwardly from the band 96 and is selectively received in one of the apertures 104 to latch the strap 85 in place on the reel 89.

It will be seen by the above described invention there has been provided a relatively simple yet highly effective protective closure and latch means for a tape reel which may be conveniently applied to or removed from a tape reel by simple manual manipulation without requiring the usual tools and which will serve to adequately protect tape wound on the reel against contamination of dust or other foreign material. The device of this invention is relatively inexpensive to construct and extremely convenient to use and may be supplied in sizes suitable for all standard tape reels. The convenience in applying the protective closure of this invention to a tape reel without the use of tools is particularly important in the case of photographic film in which case the operation may be performed in a dark room where visual observation of the operation is not possible or is impractical.

It will be obvious to those skilled in the art that various changes may be made in the invention without departing from the spirit and scope thereof and therefore the invention is not limited by that which is shown in the drawings or described in the specification but only as indicated in the appended claims.

What is claimed is:

1. A tape reel protective closure and latch for application to a conventional tape reel having a hub and spaced flanges for retaining tape wound on the hub, said closure and latch comprising a strap of flexible yieldable material and of a length to extend around the periphery of the flanges of said reel, said strap having a body portion of a width to be tightly received between said flanges, inwardly projecting radial flanges on opposite side edges of said strap, said radial flanges being spaced from said body portion to provide grooves for receiving the peripheral edges of said reel flanges, said body portion having a longitudinal opening therein at least at one end of said strap, a projecting tab on the opposite end of said strap of a length and size to be received in said opening when said strap is disposed on a reel, said tab being of relatively stiff material, and cooperating means on said strap and tab for releasably securing said strap on a reel, said radial flanges being bevelled to facilitate application of said closure to a reel, one of said radial flanges projecting inwardly a greater distance than the other radial flange to further facilitate application of said closure to a reel.

2. A tape reel protective closure and latch for application to a conventional tape reel having a hub and spaced flanges for retaining tape wound on the hub, said closure and latch comprising a strap of flexible yieldable material and of a length to extend around the periphery of the flanges of said reel, said strap having a body portion of a width to be tightly received between said flanges, inwardly projecting radial flanges on opposite side edges of said strap, said radial flanges being spaced from said body portion to provide grooves for receiving the peripheral edges of said reel flanges, said body portion having a longitudinal opening therein at least at one end of said strap, a projecting tab on the opposite end of said strap of a length and size to be received in said opening when said strap is disposed on a reel, said tab being of relatively stiff material, and cooperating means on said strap and tab for releasably securing said strap on a reel, said body portion comprising spaced, inwardly projecting radial walls and an inner peripheral wall provided by peripheral flanges projecting toward each other from the inner edges of said radial walls and terminating in spaced relationship.

3. A tape reel protective closure and latch for application to a conventional tape reel having a hub and spaced flanges for retaining tape wound on the hub, said closure and latch comprising a strap of flexible yieldable material and of a length to extend around the periphery of the flanges of said reel, said strap having a body portion of a width to be tightly received between said flanges, inwardly projecting radial flanges on opposite side edges of said strap, said radial flanges being spaced from said body portion to provide grooves for receiving the peripheral edges of said reel flanges, said body portion having a longitudinal opening therein at least at one end of said strap, a projecting tab on the opposite end of said strap of a length and size to be received in said opening when said strap is disposed on a reel, said tab being of relatively stiff material, and cooperating means on said strap and tab for releasably securing said strap on a reel, said cooperating means comprising a transverse rib on said tab and said strap having at least one transverse slot for receiving said rib to releasably secure said strap on a reel.

4. A tape reel protective closure and latch for application to a conventional tape reel having a hub and spaced flanges for retaining tape wound on the hub, said closure and latch comprising a strap of flexible yieldable material and of a length to extend around the periphery of the flanges of said reel, said strap having a body portion of a width to be tightly received between said flanges, inwardly projecting radial flanges on opposite side edges of said strap, said radial flanges being spaced from said body portion to provide grooves for receiving the peripheral edges of said reel flanges, said body portion having a longitudinal opening therein at least at one end of said strap, a projecting tab on the opposite end of said strap of a length and size to be received in said opening when said strap is disposed on a reel, said tab being of relatively stiff material, and cooperating means on said strap and tab for releasably securing said strap on a reel, said cooperating means comprising a pair of spaced transverse ribs on said tab and said strap having a pair of transverse slots spaced the same distance as said ribs, whereby one rib may be received in one slot for one diameter of said closure and said pair of ribs received in said pair of slots for another diameter of said closure.

5. A tape reel protective closure and latch for application to a conventional tape reel having a hub and spaced flanges for retaining tape wound on the hub, said closure and latch comprising a strap of flexible yieldable material and of a length to extend around the periphery of the flanges of said reel, said strap having a body portion of a width to be tightly received between said flanges, inwardly projecting radial flanges on opposite side edges of said strap, said radial flanges being spaced from said body portion to provide grooves for receiving the peripheral edges of said reel flanges, said body portion having a longitudinal opening therein at least at one end of said strap, a projecting tab on the opposite end of said strap of a length and size to be received in said opening when said strap is disposed on a reel, said tab being of relatively stiff material, and cooperating means on said strap and tab for releasably securing said strap on a reel, an arcuate member being disposed within said body portion which extends between the opposite ends of said strap to retain said strap in a generally circular condition.

6. A tape reel protective closure and latch as defined in claim 5 in which said arcuate member is endless and contractible to urge said strap into closed position around a reel.

7. A tape reel protective closure and latch as defined in claim 5 in which said arcuate member is endless and expandable to urge the ends of said strap apart and to facilitate removal from a reel.

References Cited by the Examiner

UNITED STATES PATENTS

| | | | |
|---|---|---|---|
| 1,304,021 | 5/1919 | Carter | 206—52 |
| 1,461,029 | 7/1923 | Doty. | |
| 2,174,049 | 9/1939 | Werner | 206—53 |
| 2,397,087 | 3/1946 | Camras. | |
| 3,138,432 | 6/1964 | Kleinhans. | |

FOREIGN PATENTS

| | | |
|---|---|---|
| 265,534 | 3/1950 | Switzerland. |

LOUIS G. MANCENE, *Primary Examiner.*